(12) United States Patent
Fischer

(10) Patent No.: US 6,623,598 B2
(45) Date of Patent: Sep. 23, 2003

(54) APPARATUS FOR APPLYING TREAD MATERIAL ONTO A TIRE

(75) Inventor: Florian Fischer, Ebersberg (DE)

(73) Assignee: A-Z Formen- und Maschinenbau GmbH (DE)

( * ) Notice: Subject to any disclaimer, the term of this patent is extended or adjusted under 35 U.S.C. 154(b) by 129 days.

(21) Appl. No.: 09/844,482

(22) Filed: Apr. 26, 2001

(65) Prior Publication Data

US 2002/0005256 A1 Jan. 17, 2002

(30) Foreign Application Priority Data

Apr. 26, 2000 (DE) .......................................... 100 20 415

(51) Int. Cl.[7] .............................................. B29D 30/52
(52) U.S. Cl. ........................ 156/405.1; 156/95; 156/909
(58) Field of Search ................................ 156/95, 96, 97, 156/909, 394.1, 405.1, 125; 425/12, 13, 15, 16, 19; 264/36.14, 326, 328.3

(56) References Cited

U.S. PATENT DOCUMENTS

| | | | | |
|---|---|---|---|---|
| 2,421,102 A | * | 5/1947 | Lakso et al. .................. | 425/14 |
| 2,837,767 A | * | 6/1958 | MacDonald .................. | 425/13 |
| 3,190,338 A | * | 6/1965 | Wolfe .......................... | 156/97 |
| 3,808,076 A | * | 4/1974 | Barwell ....................... | 156/96 |
| 3,933,553 A | * | 1/1976 | Seiberling ................... | 156/123 |
| 4,857,122 A | * | 8/1989 | Majerus ...................... | 156/125 |
| 5,458,727 A | * | 10/1995 | Meyer ......................... | 156/96 |

\* cited by examiner

*Primary Examiner*—Geoffrey L. Knable
(74) *Attorney, Agent, or Firm*—R W Becker & Associates; R W Becker

(57) ABSTRACT

An apparatus for applying tread material onto a tire is provided and applies uncured tread material to the carcass of a tire having a tread surface and a flank. The apparatus includes an extruder for extruding a selected one of a rubber and a synthetic material mixture and a first applicator device orientable toward the tread surface of the carcass. The apparatus also includes a second applicator device disposed adjacent the first applicator device and orientable toward the flank of the carcass. The apparatus further includes an extrusion nozzle extending between the first applicator device and the second applicator device for passage therethrough of the mixture extruded by the extruder.

13 Claims, 1 Drawing Sheet

APPARATUS FOR APPLYING TREAD MATERIAL ONTO A TIRE

BACKGROUND OF THE INVENTION

The present invention relates to an apparatus for applying tread material onto a tire.

A conventional apparatus for applying a tread onto a tire is described, for example, in EP-A1-637 506. In the process using this conventional apparatus for applying tread material onto a tire, below-the-surface openings in the outer surface of the carcass, which is the structure onto which the tread is to be applied, are filled to be level with the surrounding surface with overflow material comprising a binder rubber component, whereby the outer surface of the carcass is brought into a uniform surface level condition. Also, additional projections which are turned toward the flanks of the tire are built up with a binder rubber component onto the carcass to serve as well in rendering the outer surface of the carcass into a uniform surface level condition.

Very large tires including, in particular, tires for earth moving equipment, which together are hereinafter called EM tires and which have diameters between about two to three meters, can be subject to the chunking off of decidedly large pieces in their shoulder regions during the grinding off of the remaining tread especially if a roughly configured profile is present. This chunking off is attributable to the non-uniform force impact of the cutting knife through the tread profile projections as most such tires have decidedly hard tread profile blocks or lugs with correspondingly low elasticity which are generally first tilted before the cutting thereof is performed. During the grinding of just such tires, there occurs not only the chunking off of such pieces but also the occurrence of tears of large and small dimension and, indeed, this happens regularly in particular in the region of the shoulder of the carcass which is the location at which the tread profile is typically at its largest.

In view of the fact that such EM tires are high value and are correspondingly expensive products, the handling of such chunking off and tear damage in the shoulder regions of such tires has conventionally been by hand, whereby a repair person improves the respective deficiencies with a hand extruder. This work is decidedly time consuming in view of the large working surface. Even if the repair person applies effort, it is typical that a uniformly level outer surface cannot be obtained so that further labor must be expended; this further labor has conventionally typically comprised hand cutting with a rubber knife in order to thereby place the carcass in a relatively uniform round condition for the retreading operation.

It should be recognized that tears, which are not necessarily extremely small, involve some hand work to initially cut out around the tears and then fill the correspondingly enlarged area. This work is necessitated by the fact that binder rubber cannot effectively penetrate small and deep tears so that an attempt to introduce binder rubber into such tears would result in air being trapped within the tire carcass which would substantially reduce the quality of the retreaded tire.

The cutting out of the tears in the shoulder region of the carcass is, in any event, time consuming so that it is common to strike a compromise or trade-off and thus, on occasion, accept very small amounts of trapped air.

The challenge thus is, at the core, an urgent need to improve the decidedly laborious conventional manner to prepare a tire for a retreading operation—that is, to improve the steps between the grinding off of the tread profile, which is the so-called roughening of the carcass, and the application of a binder rubber layer on the roughened carcass.

It has also already been proposed to omit the hand labor steps to improve the outer surface of the carcass and instead to immediately iron out the binder rubber layer after the cutting out of the tears. However, the results of this approach have been less than satisfactory in that the areas below the surface in the tire shoulder are typically insufficiently filled and, additionally, small tears must be completely cut out to even have a realistic chance of maintaining a carcass relatively free of trapped air.

On the other hand, it would be desirable to avoid the necessity of having to cut out micro tears or relatively shallow tears.

SUMMARY OF THE INVENTION

The present invention offers an apparatus for applying tread material onto a tire as a solution to the challenge of providing an apparatus for applying tread material onto a tire which allows greater tolerance in the conditions of the carcass of the tire to be retread so that the preparation of the tire before the application of the new tread thereon is less critical and which additionally makes possible an improved quality of retreaded tires.

The apparatus for applying tread material onto a tire of the present invention provides the advantage that an intensive material application can be conducted precisely in the tear susceptible shoulder regions of the carcass. It is to be understood that, moreover, an especially good filling of cut out areas with an intensive connection of material to the underlying carcass material is possible without departing from the scope of the present invention. As a result of the focused and high pressure of the shoulder extruder of the apparatus for applying tread material onto a tire of the present invention, an intensive filling of the shoulder region is already ensured so that the relatively shallow tears do not require any cutting out work. It is also particularly beneficial that the apparatus for applying tread material onto a tire of the present invention is configured such that the applicator devices, which are at an angle to one another and accommodated to the flank and the tread surface of the carcass, optimally prepare the targeted outer surface in a known manner for the retreading operation and, in particular, that no out of roundness will occur. This is especially important in connection with EM tires since the detrimental influence of an out of round condition strongly increases in correspondence with the increase in tire diameter, whereby particular care must be taken with tires as large and expensive to produce as EM tires.

The tread surface which is obtainable by the use of the apparatus for applying tread material onto a tire of the present invention is significantly better than that obtainable by the conventional method of filling cut out areas by means of a hand extruder and cutting away the excess filling material with a hot knife.

In view of the fact that the tread surface which is obtainable by the use of the apparatus for applying tread material onto a tire of the present invention is correspondingly better, it is not necessary to perform the roughening—that is, the grinding off of the existing tread profile—to such a deep extent. Accordingly, the risk is reduced that the belt in the carcass will become involved during the grinding off process. It is possible to perform the grinding off to a level only a few millimeters beyond that of the tread profile so that the thickness of the newly applied tread build up can be held to the minimum thickness possible. Since correspondingly less existing tread material needs to be ground off, the cutting speed of the cutting knife can be somewhat reduced, whereupon the tendency for tears and the deepening of openings is reduced or, alternatively, if the cutting speed of the cutting knife is maintained, the throughput of the retreading machine will increase.

In view of the fact that the angle included between the flank and the tread surface varies among the different EM tires, there are basically two alternate configurations of the apparatus for applying tread material onto a tire of the present invention which can accommodate the extruder of the apparatus for applying tread material onto a tire to the various included angles. In accordance with one alternate configuration, one of the two applicator devices can be configured so that the angle it forms with the other applicator device is adjustably variable, whereby the various included angles between the flank and the tread surface of the different EM tires can be accommodated. In accordance with the other alternate configuration, one of the two applicator devices is exchanged for another applicator device having a different fixed angular relationship to the non-exchanged applicator device. The fixed angle between the two applicator devices is typically about 110°.

In a particularly advantageous embodiment of the apparatus for applying tread material onto a tire of the present invention, it is provided that the extruder screw conveyor is controlled in response to pressure. In this connection, a pressure sensor is disposed adjacent the extruder nozzle and is in direct connection with the extruder screw conveyor in a control loop such that the most uniform possible pressure is maintained at the extruder nozzle. For example, a PID controller can be used for the desired control characteristic.

As a recess or depression which is to be filled comes under the extrusion nozzle during the rotation of the carcass, extrudate flows into the recess or depression, whereupon the pressure, which is being monitored by the pressure sensor, correspondingly decreases. In response, the extruder nozzle is accelerated. Once the filling of the recess or depression is at least partially completed, the pressure again increases whereupon the pressure sensor responsively effects a reduction in the rotational speed of the extruder screw conveyor. During the passage past the extruder nozzle of areas of the shoulder of the tire which are free of areas requiring filling, the extruder screw conveyor is controlled by the pressure sensor to remain in a non-feeding condition or is controlled to rotate at only a very small speed so that a smeared layer of extrudate is applied onto the carcass as a coherent film which, for example, can be less than 1 mm thick and which serves as well in the preparation of the tire carcass for the subsequent retreading of the tire.

If the extrudate comprises binder rubber, it is possible to achieve a particularly good adhesion of the tread bands applied onto the shoulder regions of the tire without requiring the special attention which must normally be paid during the application of the binder rubber layer in a CTT- or CTC process handling of the shoulders due to the customary large problems associated therewith.

In view of the fact that a very thin binder rubber layer is sufficient, it is possible to realize a corresponding decidedly economic preparation of the tire for its subsequent retreading.

In correspondence with the type of recess or depression on the carcass, a shoulder cavity can exhibit a depth up to 10 cm and a volume of 1 liter. It is to be understood, however, that it is possible, in accordance with the automatic filling of the cavities in accordance with the present invention, to effect an accommodation of a wide range of cavity sizes.

BRIEF DESCRIPTION OF THE DRAWINGS

The object and advantages of the present invention will appear more clearly from the following specification in conjunction with the accompanying drawing, in which.

DETAILED DESCRIPTION OF THE PREFERRED EMBODIMENT

Figure 1:
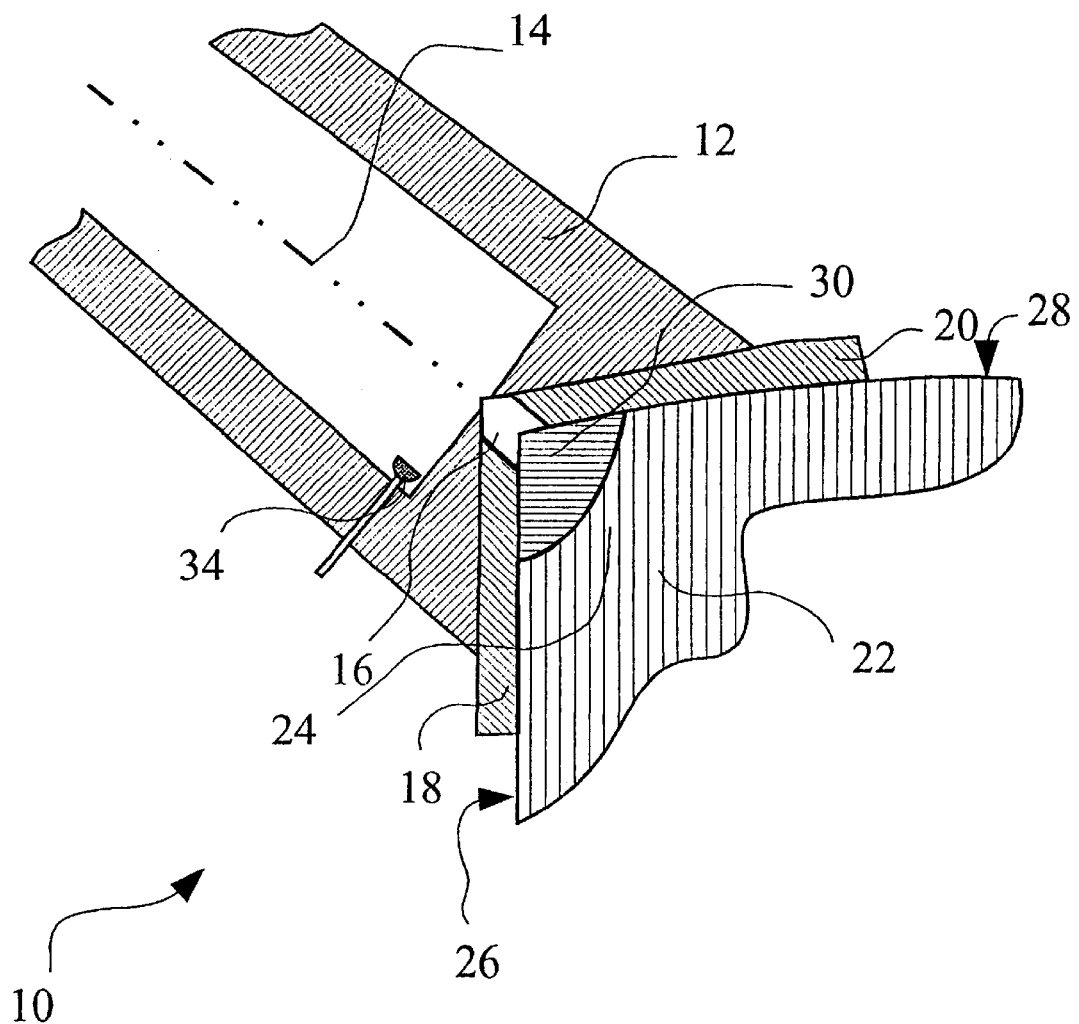
FIG. 1 is a sectional view of one embodiment of the material applying apparatus of the present invention.

FIG. 1 shows the one embodiment of the material applying apparatus of the present invention, designated as the apparatus for applying tread material onto a tire 10, which includes an extruder 12 having, as is schematically shown, an extruder screw conveyor 14 and an extrusion nozzle 16. The extruder is specially configured such that two applicator devices 18 and 20 extend adjacent the extrusion nozzle 16, the two applicator devices forming an included angle of approximately 110° between themselves.

The applicator devices 18 and 20 follow the contour of the outer surface of a tire carcass 22 which is mounted for rotation during the tire retreading process, whereby, in FIG. 1, an upper left hand shoulder 24 of the carcass 22 is shown. The applicator device 18 follows the contour of a flank 26 of the tire while the applicator device 20 follows the contour of a tread surface 28. The outer surfaces of both applicator devices 18 and 20, which are turned toward the carcass 22, are preferably approximately concave, whereby solely the outer surface of the applicator device 20 is shown in FIG. 1.

As viewed in the direction of rotation of the carcass, the distance between the applicator devices 18, 20 and the carcass 22 decreases, as can be seen with respect to the practical spacing disposition of the applicator device shown in EP-A1-637 506.

The carcass 22 includes, in the area of its shoulder 24, a recess 30 which has been formed by a cutting out process which was undertaken to cut out or widen the area surrounding a tear or a crack that was present following the grinding off of the previous tire tread or a roughening of the surface of the carcass.

FIG. 1 shows the operational stage at which the recess 30 has already been filled with a binder rubber applied by the extruder 12.

A pressure sensor 34 is disposed adjacent the extrusion nozzle 16 but outside the turning range of the extrusion screw conveyor 14, the pressure sensor being operable to sense the outlet pressure of the extruder 12 and control the feed speed of the extrusion screw conveyor 14.

In this connection, it is advantageous if an appropriately suitable control device is provided, whereby the control device is not shown in FIG. 1.

It is to be understood that modifications and variations of the one embodiment of the material applying apparatus of the present invention herein described are possible within the scope of the present invention. For example, both applicator devices 18 and 20 can alternatively be constructed as a single component, whereby, in this construction, the included angle between the two sides is fixed so that, to accommodate a differently dimensioned tire, the double applicator devices must be exchanged for other double applicator devices.

It is to be understood that, as required, a multiple extrusion nozzle arrangement can be advantageously deployed in lieu of the extrusion nozzle 16 described with respect to the one embodiment of the material applying apparatus of the present invention, the multiple extrusion nozzle arrangement being customizable to the requirements at hand such as, for example, by having one extrusion nozzle at the largest tire diameter at an angle between the tread surface and the tire flank and two small extrusion nozzles arranged adjacent this one extrusion nozzle with the one extrusion nozzle having a widening nozzle outlet in order, on the one hand, to rapidly fill large recesses and, on the other hand, to be able to fill fine cracks through intensive ironing out of these areas by the lateral extrusion nozzles.

It can be further understood that, as needed, the applicator device 20 can also be pulled toward the tire axial center or equator so that a uniform binder rubber layer can be applied over a selected extrusion along the respective tire half.

It is further additionally possible, as an alternative to the one embodiment of the material applying apparatus of the present invention, which is specifically accommodated to the particular side geometry of the tire, to configure the apparatus to be deployable both from the right and the left of the tire. This alternative configuration is particularly advantageous with tires on which the convex geometry of the tread surface 28 and the flank 26 is substantially the same. If—as is preferred—separate configurations are provided for the right and left shoulders 24, it is also possible to specifically configure only the applicator devices 18 and 20 for their respective tasks while configuring the extruder 12 in its standard configuration.

The specification incorporates by reference the disclosure of German priority document 100 20 415.5 of Apr. 26, 2000.

The present invention is, of course, in no way restricted to the specific disclosure of the specification and drawings, but also encompasses any modifications within the scope of the appended claims.

What I claim is:

1. In an application apparatus for applying tread material onto a tire, the tire having a carcass with a tread surface thereon onto which uncured tread material is to be applied and a flank, the improvement comprising:

an extruder for extruding a selected one of a rubber and a synthetic material mixture;

first applicator device orientable toward the tread surface of the carcass;

a second applicator device disposed adjacent the first applicator device and orientable toward the flank of the carcass; and an extrusion nozzle extending between the first applicator device and the second applicator device for passage therethrough of the mixture extruded by the extruder, wherein said carcass is mounted for rotation relative to said extruder.

2. An apparatus for applying tread material onto a tire according to claim 1, wherein the applicator devices are at an obtuse angle to each other.

3. An apparatus for applying tread material onto a tire according to claim 1, wherein the angle included between the applicator devices is adjustable, whereby the applicator devices can be adjusted relative to one another to vary the included angle in correspondence with the tire to be retreaded.

4. An apparatus for applying tread material onto a tire according to claim 1, wherein the length of each applicator device is less than half the axial width of the tread surface.

5. An apparatus for applying tread material onto a tire according to claim 1, wherein the apparatus for applying tread material onto a tire is configured as a symmetrical assembly relative to the equator of the tire with elements of the apparatus disposed respectively on the right and left hand shoulders of the tire.

6. An apparatus for applying tread material onto a tire according to claim 1, and further comprising another extruder configured substantially the same as the extruder, each extruder being deployable at a respective one of the right and left shoulders of the tire.

7. An apparatus for applying tread material onto a tire according to claim 1, wherein the carcass is mounted for rotation relative to the extruder at a speed of rotation of from one revolution per 2 minutes to one revolution per 45 minutes, and the speed of rotation is adjustable.

8. An apparatus for applying tread material onto a tire according to claim 1, wherein the diameter of the carcass is more than 1.5 meters.

9. An apparatus for applying tread material onto a tire according to claim 1, and further comprising an extruder screw conveyor rotatable about its axis for advancing material, and a pressure sensor disposed for sensing the rate of extrusion of material through the extrusion nozzle and operably connectable to a control device for controlling the rate of rotation of the extruder screw conveyor.

10. An apparatus for applying tread material onto a tire according to claim 2, wherein the applicator devices are at an obtuse angle of 110° to one another.

11. An apparatus for applying tread material onto a tire according to claim 4, wherein the length of each applicator device is approximately one-fifth of the axial width of the tread surface.

12. An apparatus for applying tread material onto a tire according to claim 7, wherein the carcass is mounted for rotation relative to the extruder at a speed of rotation of one revolution per 15 minutes.

13. An apparatus for applying tread material onto a tire according to claim 8, wherein the diameter of the carcass is more than 2 meters.

* * * * *